UNITED STATES PATENT OFFICE.

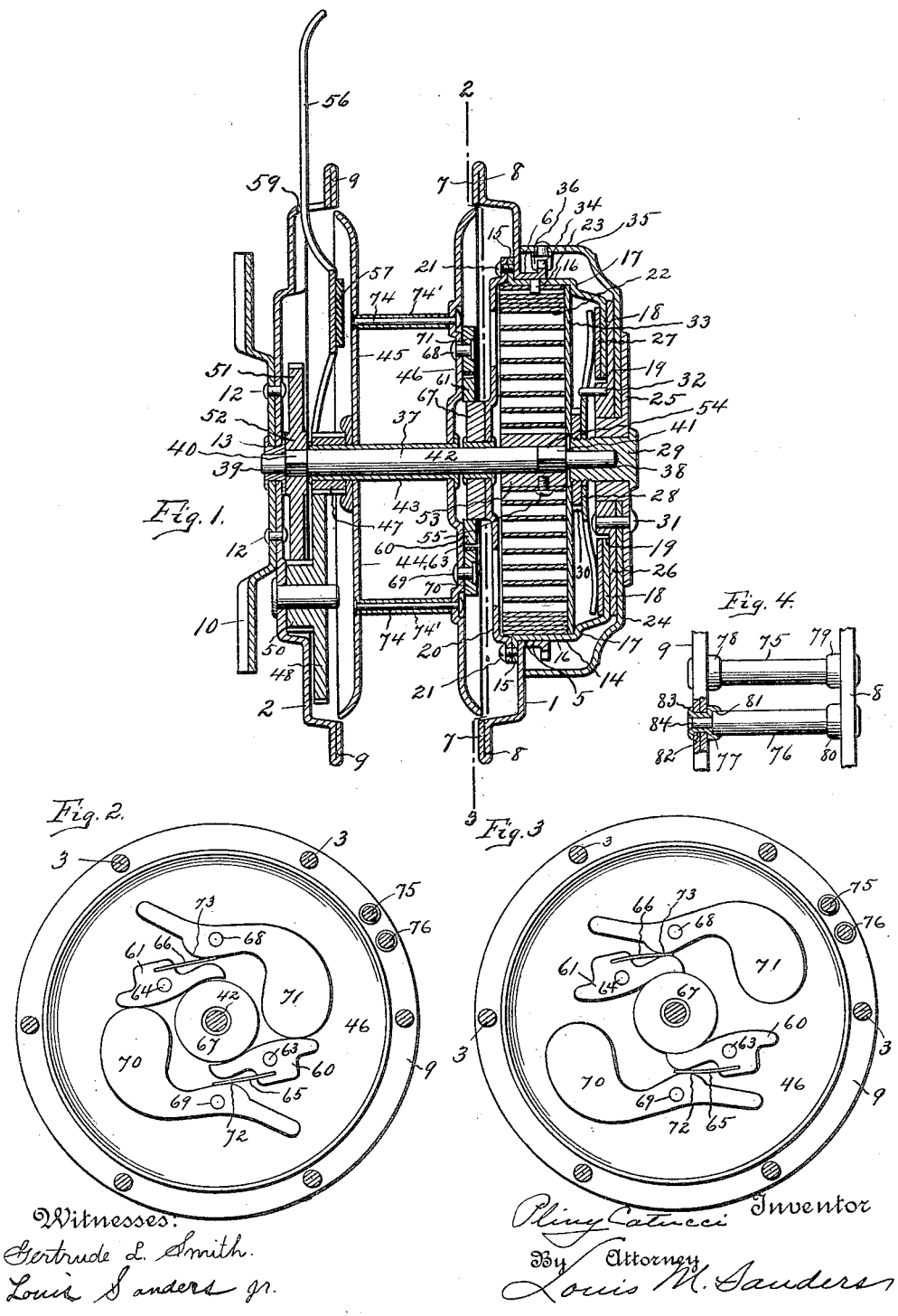

PLINY CATUCCI, OF NEWARK, NEW JERSEY, ASSIGNOR TO A. F. MEISSELBACH & BROTHER, A CORPORATION OF NEW JERSEY.

AUTOMATIC FISHING-REEL.

1,101,726.  Specification of Letters Patent.  Patented June 30, 1914.

Application filed February 7, 1912. Serial No. 675,961.

*To all whom it may concern:*

Be it known that I, PLINY CATUCCI, a citizen of the United States, a resident of the city of Newark, county of Essex, and State of New Jersey, have invented certain new and useful Improvements in Automatic Fishing-Reels, of which the following is a clear, full, and exact description of the same, such as will enable others skilled in the art to make, construct, and use the same.

My invention is an improvement on the fishing reel described in my prior patent application 649,707, filed Sept. 16, 1911, and has for its object the provision of centrifugal brake mechanism to prevent the too rapid winding in of the line under the impulse of the spring.

It also contemplates the use of antifriction line guides, to prevent the snarling and tangling of the line and the proper laying of the same upon the spool.

Certain other minor details of improvement will appear in the following details and description, all of which are designed to improve the construction and operation of the reel.

In the accompanying drawings forming a part of this specification, Figure 1 is a sectional view of the reel and its parts. Fig. 2 is a section on line 2—3 showing the centrifugal brake mechanism with the brake pressure released. Fig. 3 is a view similar to Fig. 2 showing the centrifugal brake mechanism in operation. Fig. 4 is a detached detail view showing the line guides with one of the journal bearings shown in section.

Similar letters of reference refer to like parts throughout the specification and drawings.

As above indicated the present invention is an improvement on my prior patent application, the main details being substantially the same as those set out in said prior application. The frame of the reel consists of the front head plate 1, the back head plate 2, connected together by means of spacing posts 3. The front head plate consists of a metal disk pressed to the shape as shown, having its center cut out as at 5 and the margin of the aperture flanged outwardly as at 6, and provided with ratchet teeth. The outer margin of the plate is turned back upon itself as at 7, to form a marginal reinforce 8. The back head plate 2 is pressed from a disk of metal into the shape as shown, with the margin turned back upon itself to form the reinforce 9, similar in all respects to the reinforce 8. The foot plate 10, by which the reel is secured to the fishing pole, is rigidly secured to the back plate by means of suitable rivets 12. Through the foot and back plates is a central aperture in which is secured the spindle bearing 13. The spring cup 14 is made of a disk of metal pressed into shape as shown in Fig. 1, with the marginal flange 15, the cylindrical portion 16, shoulder 17 and flat part 18, the latter part being cut out to form the central aperture 19. The bridge piece 20 extends diametrically across the spring cup and has its ends secured to the flange 15, by means of the screws 21. This bridge piece serves the double purpose of confining the spring 22 within the cup, and also forms a support for the brake disk hereinafter to be described. The outer end of the spring 22 is connected to a hook 23 extending in from the cylindrical part 16 of the cup with its inner end secured to a thimble 53 mounted upon the spool spindle hereinafter to be described. The external diameter of the cup body 16 is such that it fits into and finds a bearing upon the flange 6 of the head plate 1 with the flange 15 of the cup bearing upon the flat inner surface of the head plate, as clearly shown in Fig. 1. This construction permits the spring cup with its accompanying parts to rotate within the aperture 5 and upon the flanged bearing 6 with the requisite degree of freedom.

The winding cap 24 is pressed into the shape shown from a disk of metal and is secured to the flat part 18 of the spring cup 14 by means of a series of friction disks. The cap 24 is provided with the strengthening plate 25 and upon the inner face with the friction disk 26, against which the flat part 18 of the spring cup 22 bears directly. Within the spring cup and bearing upon the flat part 18 is a second friction disk 27.

spring disk 28. This latter disk is provided with radial arms, and is dished or cambered in its central portion to give it elasticity. The friction disks, spring cup, and winding cap are held together by means of a central journal bearing 29 which extends through the strengthening disk 25 and having its inner end screw threaded and provided with an adjusting nut 30, whereby the friction of the several parts may be adjusted.

The rivets 31 secure the strengthening disk 25, the winding cap 24, and the disk 26 together, so that they form substantially one integral part. The journal bearing 29 extends through the central portion of the strengthening disk 25 and forms a very tight fit. In order that the star disk may be made to rotate along with the winding cap, I extend a pin 32 from the inner face of the disk 26 between a pair of the arms of the star disk 28. In this manner it will be seen that the winding cap 24, the disk 26 and the star spring are all made to rotate in unison with the flat portion 18 of the spring cup lying between.

Within the spring cup 14 and resting against the shoulders 17 is a centrally apertured disk 33 which serves the purpose of separating the friction disks heretofore described, from the main portion of the spring barrel or cup 14. The outer circumference of the flange 6 is flanged over as shown and provided with ratchet teeth 34, or if desired the ratchet teeth may be formed upon a separate ring and said ring secured to the flange 6 by soldering. Upon the inner flange 35 of the winding cap 24 is secured the spring pawl 36, in position for engagement with the teeth of the ratchet 34. The teeth of the ratchet are directed in such a manner as to permit the rotation of the winding cap 24 in a direction to wind up the spring 22, but to prevent its unwinding.

The spindle 37 is mounted in the bearings 13 and 29, to freely rotate therein. The spindle is provided with the cylindrical journals 38 and 39, the squared portions 40 and 41, and the cylindrical body portion 42. Mounted upon the spindle body 42 is a sleeve or hub 43 of the spool 44 at the ends of which are the spool flanges 45 and 46. The end of the sleeve 43 is provided with a pinion 47. Meshing with the pinion 47 is the spur gear 48 mounted upon the stub shaft which is secured, as shown, to the back head plate 2. Rigidly secured to the gear 48 in any convenient manner is the pinion 50, so that both pinion and gear rotate together. Meshing with the pinion 50 is pinion 51 having its hub 52 secured to the squared part 40 or the spindle 37. The arrangement is such that the rotation of the spindle 37 is communicated with increased speed around through the gear train of the spindle body 42 is mounted a spring sleeve or thimble 53 with a partially squared aperture 54, so that the squared aperture takes over the squared part 41 of the spindle. This construction permits the sleeve 53 to slide a limited distance along the spindle and yet the sleeve is constrained to rotate with the spindle. The sleeve 53 is provided with a hook or stud 55 over which the inner end of the spring 22 is fastened. I show substantially the same drag mechanism as fully described and illustrated in my prior application and which consists of a double arm spring lever 56, secured to the back head plate 2, and having its lever extending out through a slot 59 in the back head plate 2. It is made of spring metal and slightly cambered so as to normally bear upon the adjacent face of the spool flange 45. As shown in Fig. 1, the spring arm 56 has its friction leather 57 held out of contact with the adjacent face of the flange 45. Upon the opposite spool head 46 I provide a pair of specially formed brake shoes 60 and 61, pivoted at 63 and 64 upon said spool flange 46. These brake shoes are in position to bear upon the brake disk 67 heretofore referred to as being rigidly secured to the bridge piece 20 and which can rotate only with the spring cup 14. Pivoted adjacent to the brake shoes 60 and 61, as at 68 and 69, are the centrifugal weights 70 and 71, each provided with a cam face, as 72 and 73 in a location to bear respectively upon the springs 65 and 66. These springs are secured to the brake shoes 60 and 61 by inserting the same in notches formed therefor in said brake shoes and then pressing the metal down hard upon the springs. These springs are merely flat pieces of spring metal and located in position to bear respectively upon the centrifugal weighted arms 71, as clearly shown in Figs. 2 and 3. The construction of this brake mechanism is such that normally the brake shoes 60 and 61 bear with comparatively light pressure upon the brake disk 67, and this when the centrifugal weights 70 and 71 are in the position shown in Fig. 2. When, however, the spool with its flange 46 is rotating rapidly under the influence of the spring 22, these weights 70 and 71 will fly outwardly away from the center of rotation, causing the cam parts 72 and 73 to bear upon the springs 65 and 66, and thus press the brake shoes 60 and 61 with a yielding pressure upon the normally stationary brake disk 67, so that the spool can only rotate under the influence of the spring 22, at a comparatively limited speed; and since the pressure between the brake shoes and the brake disk is a yielding pressure, there is no rattling of the parts, as would be the case if the springs 65 and 66 were omitted and the cams 72, and 73 made to bear directly upon the brake shoes 60 and 61.

The fishing lines with which the reel herein described is intended to be used, are what is known to the trade as enameled lines; that is, the lines themselves are coated and enameled. Such lines are quite expensive and their owners take every precaution for their preservation. Two particular points in the reel just described are specially designed to preserve the line or rather to prevent its deterioration, first, the spool has its flanges 45 and 46, connected together by a series of spacing rivets 74. This makes of the spool a sort of skeleton upon which the line is wound. These rivets are located between the spool flanges and pass through tubular thimbles 74' which really serve to space the flanges apart, the rivets themselves being upset upon the outside face of the flange as shown. By this construction a hollow air space is left within the thimbles 74', when the line is wound thereon, so that the line will more quickly dry out after use. The second feature looking to the preservation of the line resides in the anti-friction guide rollers 75 and 76 located between the reinforces 8 and 9, of the head plate and back plate.

In practice all of the parts upon which no special wear comes, are made of aluminum to secure lightness of the reel. This is true of the head and back plates. If the guide rollers, which, of course, are made of highly tempered steel, were journaled directly in the reinforced margins of the head and back plates, they would rapidly wear the journal bearings so much as to render them useless. In order to provide against such wear, I provide the thimble journal bearings 77, 78, 79 and 80, in which to mount the rollers 75 and 76. These thimble bearings consist of short sections of tubing having an enlarged opening at the one side as at 81 and a reduced portion as at 82, for insertion through the aperture of the reinforces of the head and back plates. This reduced portion is inserted through the aperture and then is spun down or riveted over as clearly shown at 83. This leaves a kind of overhanging flange on the bearing thimble between the plates. The rollers 75 and 76 are as shown, cylindrical in cross section and provided with reduced journals 84 at the end. The overhanging flange portion 81 is for the purpose of preventing the line from catching between the shouldered end of the roller and the adjacent faces of the head or back plate margin. In this manner the two rollers 74 and 75 may rotate very freely, and they also serve as an anti-friction and guide bearing as it is being wound upon the spool or paid out therefrom. In a reel of this character, line guides are essential to the proper working of the automatic parts, and fishermen who are accustomed to the use of an automatic reel demand such line guides. They also demand guides of a character as will produce as little wear upon the line to be used, as possible, in order that the line itself shall not be unnecessarily worn or its surface improperly abraded.

The operation of the reel is as follows: With the drag in action, that is, with the drag lever bearing upon the spool flange 45, the operator turns the winding cap 24 in the direction of the hands of a clock, to wind up the spring, by the friction disk mechanism described above. There is no danger of overwinding the spring and breaking it, for the friction disks are so adjusted that when the spring is fully wound, further turning of the winding cap will result in the slippage of the friction disks over the flat portion 18 of the spring cup 14. When it is desired to wind in the line the drag 56 is released and the reaction of the spring 22 through the spindle and gear train will cause a comparatively rapid rotation of the spool. But its too rapid rotation will be checked and governed by the centrifugal weights 70 and 71 flying outwardly from the center of rotation thereby causing the brake shoes 60 and 61 to bear with yielding pressure upon the brake disk 67. This serves to check the too rapid winding in of the line, while at the same time it does not diminish the tendency of the spring 22 to wind in the line. I find also that the braking of the spool in this manner serves another very important purpose, and that is, it checks what is called the overrunning of the line when the spring 22 is nearly run down, that is to say, if the spool were allowed free rotation without any check upon it whatsoever, its own rotative inertia would have a tendency to carry it beyond a point where the spring is completely run down, with a resultant tendency to fracture the spring. This checking of the too rapid rotation of the spool completely obviates this difficulty. Another difficulty is also obviated, and that is the following: Without the automatic brake mechanism the angler often forgets himself, when the line is out of the water and being wound in and holds the drag away from the spool flange 45, which will bring the line in with a jerk, and if it comes far enough the hook upon the end of the line is liable to strike the end of the fishing pole tip and either snap the hook off or snap the tip of the rod off. The drag lever under such circumstances has to be watched very carefully and thrown into operation just at the right instant or the accident above referred to will follow. This however is entirely obviated by the use of the braking apparatus above described.

I do not desire to confine the use of the centrifugal braking mechanism above described to automatic reels, as it is obvious that the same may be applied to ordinary casting reels to prevent the too rapid paying out of the line and consequent tangling of the same upon casting. The location of the brake shoes and the centrifugal weights under such conditions would be the same as indicated in the drawings above but the brake disk would be located upon a stationary part of the reel frame.

I regard the interposed springs between the weighted arms and the brake shoes as a very important feature of my invention, inasmuch as the pressure transmitted from such weighted arms to the braking faces through the brake shoes is what may be termed a yielding pressure as distinguished from a positive dead pressure. It is obvious that the pressure of the brake shoes upon the brake disk will vary with the centrifugal tendency of the weighted arms, and such centrifugal tendency will vary with the speed of rotation of the spool.

Obvious changes in the structure may be made without departing from the spirit or scope of my invention.

I claim,

1. In a fishing reel, the combination of a reel frame, a line spool rotatively mounted in said frame, spring mechanism for rotating said spool to automatically wind a line thereon, a stationary brake disk supported upon said frame, a brake shoe mounted upon said spool for coöperation with said disk, a centrifugal weight for coacting with said shoe, a spring interposed between said weight and said shoe whereby rapid rotation of said spool will produce a cushioned braking action between said shoe and said disk.

2. In a fishing reel, the combination of a reel frame, a line spool rotatively mounted in said frame, spring mechanism for rotating said spool to automatically wind a line thereon, a normally stationary brake disk supported upon said frame, a pair of brake shoes pivotally mounted upon said spool for coöperation with said disk, a pair of weighted arms, also pivotally supported upon said spool adjacent to said shoes, a spring interposed between each shoe and the corresponding weighted arm, whereby the too rapid winding in of the line will be governed by the braking action of said shoes upon said disk.

3. In a fishing reel, the combination of a reel frame, a line spool rotatively mounted in said frame, spring mechanism for rotating said spool to automatically wind a line thereon, a normally stationary brake disk supported upon said frame, a pair of brake shoes pivotally mounted upon said spool for coöperation with said disk, a pair of weighted arms, also pivotally supported upon said spool adjacent to said shoes, a spring interposed between each shoe and the corresponding weighted arm, whereby the too rapid winding in of the line will be governed by the braking action of said shoes upon said disk, and an anti-friction line guide upon said frame for preventing the tangling of the line while winding in.

4. In an automatic fishing reel, the combination of a reel frame, a spindle supported in bearings in said frame, a spool rotatively mounted upon said spindle, a multiplying gear train operatively connecting said spindle with said spool, a pair of brake shoes mounted upon said spool, a pair of centrifugal weights for coacting with said shoes, springs interposed between said weights and said shoes, a stationary brake disk secured to a part of the reel for coöperation with said brake shoes, said brake mechanism designed to check the too rapid winding in of the line.

5. In a fishing reel, the combination of a frame, a line spool rotatively mounted in said frame, a brake disk supported upon said frame, a pair of brake shoes pivotally mounted upon said spool for coöperation with said brake disk, springs secured to said shoes, a pair of weighted arms also pivoted upon said spool adjacent to said brake shoes to coact therewith through said springs to set said brake shoes upon said brake disk upon the too rapid rotation of said spool.

6. In a fishing reel, the combination of a frame, a line spool rotatively mounted therein, means for automatically winding a line upon said spool, a line guide mounted upon the reel frame for preventing the tangling of the line during its automatic winding in, said guide comprising a pair of rollers, thimble bearings mounted in said frame adjacent to the spool flanges for pivotally supporting said rollers, and flanges upon said bearings which overhang said rollers to prevent fouling of the line.

7. In a fishing reel, the combination of a reel frame, a spool rotatively mounted in said frame, means for rotating said spool for winding a line thereon, a line guide for directing said line to said spool, said line guide comprising a pair of rollers, thimble bearings mounted in the frame for pivotally supporting said rollers, flanges upon said bearings which overhang said rollers to prevent the fouling of the line.

8. In a fishing reel, the combination of a frame, a spool rotatively mounted upon said frame, a brake disk supported by said frame, a brake shoe upon said spool, a centrifugal weight arm pivotally mounted upon said spool adjacent to said shoe for coöperation therewith, and a yielding connection between said shoe and said arm, whereby rapid rotation of said spool will produce a cushioned braking action between said brake shoe and said disk.

9. In a fishing reel, the combination of a frame, a spool rotatively mounted in said frame, a brake disk supported upon said frame, a pair of brake shoes pivotally mounted upon the spool for coöperation with said disk, a pair of weighted arms also pivoted upon said spool adjacent to said brake shoes to coöperate therewith, springs interposed between said shoes and said arms, whereby the too rapid rotation of said spool may be checked by the coöperation of said weighted arms, springs, shoes and disk.

In testimony whereof I have hereunto set my hand this 2d day of February 1912.

PLINY CATUCCI.

Witnesses:
AUGUST F. MEISSELBACH,
W. B. WALTZINGER.

---

Copies of this patent may be obtained for five cents each, by addressing the "Commissioner of Patents, Washington, D. C."